(12) United States Patent
Granhed et al.

(10) Patent No.: US 8,717,180 B2
(45) Date of Patent: May 6, 2014

(54) SENSOR-ACTIVATED TRANSPONDER

(75) Inventors: Magnus Granhed, Lidingö (SE); Karl-Gösta Forssén, Järfälla (SE)

(73) Assignee: Recco Systems AB, Lidingö (SE)

( * ) Notice: Subject to any disclaimer, the term of this patent is extended or adjusted under 35 U.S.C. 154(b) by 0 days.

(21) Appl. No.: 13/639,914

(22) PCT Filed: Apr. 6, 2011

(86) PCT No.: PCT/SE2011/050409
§ 371 (c)(1),
(2), (4) Date: Dec. 4, 2012

(87) PCT Pub. No.: WO2011/126444
PCT Pub. Date: Oct. 13, 2011

(65) Prior Publication Data
US 2013/0194100 A1 Aug. 1, 2013

(30) Foreign Application Priority Data

Apr. 8, 2010 (SE) ...................................... 1050334

(51) Int. Cl.
*G08B 23/00* (2006.01)
*G08B 1/08* (2006.01)
(52) U.S. Cl.
USPC ..................... 340/573.1; 340/573.4; 340/584; 340/632; 340/539.1; 340/539.11; 342/42
(58) Field of Classification Search
USPC .......... 340/573.1, 573.4, 584, 632, 669, 10.1, 340/10.34, 10.51, 539.1, 539.11, 539.13, 340/539.26, 539.32, 426.1, 988, 989; 342/51, 42; 455/403, 404.1, 404.2
See application file for complete search history.

(56) References Cited

U.S. PATENT DOCUMENTS 4,850,031 A 7/1989 Allsop et al.
5,045,839 A * 9/1991 Ellis et al. ................ 340/539.11
(Continued)

FOREIGN PATENT DOCUMENTS

WO 2004/111678 A1 12/2004

OTHER PUBLICATIONS

Swedish Patent Office, Int'l Search Report in PCT/SE2011/050409, Jul. 7, 2011.
(Continued)

*Primary Examiner* — Anh V La
(74) *Attorney, Agent, or Firm* — Piedmont Intellectual Property

(57) ABSTRACT

The present invention relates to a transponder comprising an antenna structure (31) configured to receive an incoming signal with RF power of a first frequency $f_1$ and to retransmit the incoming signal as a transparent output signal with RF power of a second frequency $f_2$ when hit by the incoming signal. The transponder further comprises: an amplifier (39) configured to provide an amplified transparent output signal based on the incoming signal; a frequency converter (35) configured to frequency convert the incoming signal into the transparent output signal; and a first frequency filter (33) connected to the antenna structure. The first frequency filter is tuned to the first frequency $f_1$ to avoid amplifying incoming signals with RF power of frequencies other than the first frequency $f_1$. The transponder further comprises a sensor (S) configured to respond to physical stimulus for generating a control signal as output response, and an activator for selectively activating or deactivating the possibility to retransmit based on the control signal of the sensor.

17 Claims, 3 Drawing Sheets

(56) References Cited

U.S. PATENT DOCUMENTS

| | | |
|---|---|---|
| 5,119,104 A | 6/1992 | Heller |
| 5,465,099 A | 11/1995 | Mitsui et al. |
| 6,167,249 A | 12/2000 | Hereford et al. |
| 6,456,228 B1 | 9/2002 | Granhed et al. |
| 7,106,246 B1 | 9/2006 | Lindell |
| 7,346,336 B2 * | 3/2008 | Kampel et al. ............. 455/404.2 |
| 8,149,112 B2 * | 4/2012 | Schlager et al. ......... 340/539.13 |
| 2003/0144111 A1 | 7/2003 | Kato |
| 2006/0012476 A1 | 1/2006 | Markhovsky et al. |
| 2009/0272814 A1 | 11/2009 | Granhed et al. |
| 2010/0274906 A1 | 10/2010 | Fuks et al. |

OTHER PUBLICATIONS

Swedish Patent Office, Int'l Preliminary Report on Patentability in PCT/SE2011/050409, Feb. 16, 2012.

* cited by examiner

SENSOR-ACTIVATED TRANSPONDER

TECHNICAL FIELD

The present invention relates to a transponder as defined by the preamble of claim 1.

BACKGROUND

Transponders may be used in a variety of applications such as positioning and navigation, e.g. for avalanche rescue and fire rescue missions.

Heliskiing, for example, is a sport in which a helicopter is used to carry skiers to slopes outside the normal ski areas in order for them to ski in deep powder. However, there is a potential risk that skiers are lost and injured during off-piste skiing near trees since voids underneath the snow surface may be formed which are not visible from above.

Today, during avalanche rescue missions, a detector unit is used to detect missing persons that carry passive transponders. The most commonly used type of avalanche rescue equipment is that produced by the Swedish company "RECCO AB". However, the passive transponders have a limited range. A description of a prior art passive harmonic transponder may be found in U.S. Pat. No. 6,456,228 by Granhed at el. The definition of a passive transponder is that a signal is transmitted from the transponder when hit by an incoming signal without any energy source involved.

In an alternative solution, the skiers are provided with an active transponder having an energy source that is used for transmitting a signal, when hit by an incoming signal, to enable an increase of the range of detection.

A different type of solution has been evaluated in a White Paper on Firefighter Location Systems by MSA, ID 0107-21-MC/January 2008, using a 2.4 GHz RF transmitter to locate people during a rescue operation. A fundamental drawback with this system is that the rescue personnel need to avoid detection of reflected signals within a building when trying to find a victim. Rescue personnel may even be lead in the opposite direction of the victim.

Thus there is a need for a new type of transponder.

SUMMARY OF THE INVENTION

An object with the present invention is to provide a transponder that has a long detection range compared to passive prior art transponders and that has improved directional properties compared to active prior art transponders.

It is also an object to provide a transponder that may facilitate the search for missing persons and/or reduce the energy consumption.

These and other objects are achieved by a transponder that comprises an antenna structure configured to receive an incoming signal with RF power of a first frequency $f_1$ and to retransmit the incoming signal as a transparent output signal with RF power of a second frequency $f_2$ when hit by the incoming signal, thus not transmitting any signals without first receiving an incoming signal with the correct frequency. The transponder further comprises: an amplifier (divided into one or more amplifier circuits) to provide an amplified output signal based on the incoming signal, a frequency converter to frequency convert the incoming signal into the output signal (preferably by frequency multiplication of the incoming signal); and at least a first frequency filter connected to the antenna structure. The first frequency filter is tuned to the first frequency $f_1$ to avoid (i.e. prevent or at least reduce the influence of) incoming signals with RF power of frequencies other than the first frequency $f_1$ from being amplified in the amplifier. The transponder further comprises a sensor configured to respond to physical stimulus for generating a control signal as output response, and an activator for selectively activating or deactivating the possibility to retransmit based on the control signal of the sensor.

An advantage with the present invention is that the transponder is in "idle mode", i.e. does not retransmit a signal until it is hit by a signal having the correct frequency, and stops to retransmit when it is not hit by the signal anymore, which thereby increases the directivity of the transponder.

Another advantage with the present invention is that the transponder may be used to locate a person (which is provided with a transponder) over a long distance, or through thick walls in a building, compared to passive prior art transponders.

It may also be easier to localize certain transponders (and thereby persons to which a transponder is attached) since the possibility to retransmit is activated only at certain physical circumstances as detected by the sensor. For example, when provided with a motion sensor, the chance of receiving signals from any other transponder than a transponder attached to a non-moving person is reduced.

The energy consumption may be significantly reduced since the output signal is transmitted only at certain physical circumstances as detected by the sensor.

Further objects and advantages may be found by a skilled person in the art from the detailed description.

BRIEF DESCRIPTION OF DRAWINGS

The invention will be described in connection with the following drawings that are provided as non-limited examples, in which:

FIG. 1b shows an electrical schematic of the prior art transponder in FIG. 1a.

DETAILED DESCRIPTION

The transponders of the invention may have two modes of operation, an idle mode and an active mode, i.e. a transponder that does not transmit a signal transparent to the input signal unless an incoming signal with RF power of a predetermined frequency is received in the transponder. Active components, such as one or more amplifier circuits, requiring an energy source are included in the transponder according to the invention, but an incoming signal needs to be received before an output signal may be transmitted. A requirement for the transponder to work with the same detector equipment that is used with the prior art passive transponders is that the output signal is transparent of the incoming signal, i.e. the same information as in the incoming signal is retransmitted at a different frequency as the output signal.

Figure 1A:
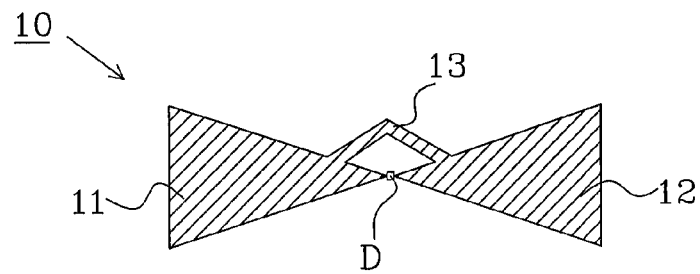
FIG. 1a shows a prior art passive transponder.
Figure 1B:
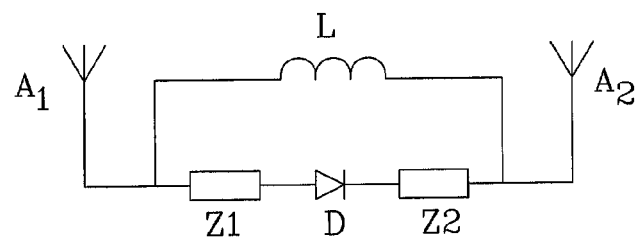

FIG. 1a shows a prior art passive transponder, and FIG. 1b shows an electrical schematic of the prior art transponder in FIG. 1a. The passive transponder 10 comprises an antenna structure having two major surfaces 11, 12. A diode D is connected between the major surfaces 11, 12 and a transmission line 13 provides connection between the major surfaces.

The equivalent electrical schematic is shown in FIG. 1b, in which the antenna structure A1, A2 is configured to receive an incoming signal with RF power of a first frequency $f_1$ and transmit a signal with RF power of a harmonic frequency $f_h$, normally the double frequency. The transmission line is illustrated by an inductance L and the connection of the diode D to the major surfaces is illustrated by a first impedance $Z_1$ connected to the diode D and a second impedance $Z_2$.

Other prior art solutions are shown in US 2005/0068223 A1, which relates to an analogue regenerative transponder for amplification of a received signal, and US 2006/0012476 A1, which relates to a system for determining the location of a fixed or mobile subject or object including a transponder disposed on the target.

According to the invention, there is provided a transponder comprising an antenna structure configured to receive an incoming signal with RF power of a first frequency $f_1$ and to retransmit the incoming signal as a transparent output signal with RF power of a second frequency $f_2$, different from said first frequency $f_1$, when hit by the incoming signal. The transponder further comprises an amplifier configured to provide an amplified transparent output signal based on the incoming signal, and a frequency converter configured to frequency convert the incoming signal into the transparent output signal. The transponder also comprises at least a first frequency filter connected to the antenna structure, where the first frequency filter is tuned to the first frequency $f_1$ to avoid amplifying incoming signals with RF power of frequencies other than the first frequency $f_1$. Further the transponder comprises a sensor configured to respond to physical stimulus for generating a control signal as output response, and an activator for selectively activating or deactivating the possibility to retransmit based on the control signal of the sensor.

The activator is simply called "activator" although it has the ability to perform the action of activating and the complementary action of deactivating the possibility of retransmission. An alternative term for the activator is "actuator" for effectuating a corresponding action such as activating or deactivating in response to the sensor control signal.

The invention will now be described with reference to illustrative and non-limiting examples.

Figure 2:
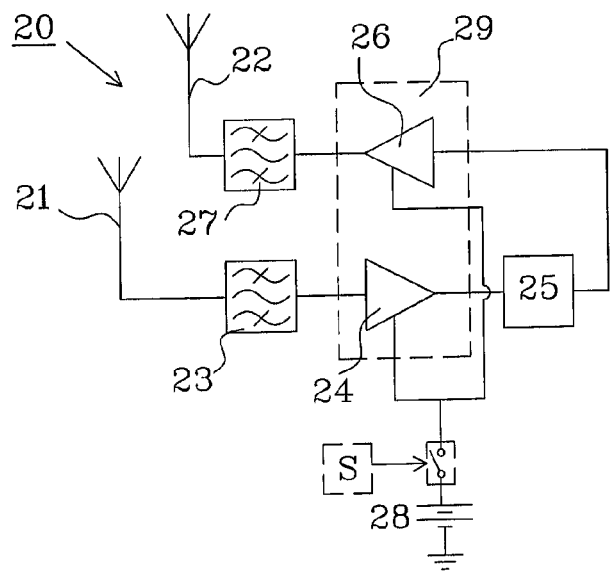
FIG. 2 shows a first embodiment of a transponder according to the invention.

FIG. 2 shows a first embodiment of a transponder 20 comprising an antenna structure with first antenna 21 configured to receive an incoming signal with RF power of a first frequency $f_1$, and a second antenna 22 configured to retransmit the incoming signal as an output signal with RF power of a second, preferably harmonic, frequency. A first frequency filter 23 is connected to the first antenna 21 and is tuned to the first frequency in order to avoid, i.e. prevent or at least reduce the influence of, incoming signals with RF power of frequencies other than the first frequency from being amplified in a first amplifier circuit 24. The amplified incoming signal is thereafter fed to a frequency converter 25 that frequency converts the incoming signal into the output signal, preferably by frequency multiplication of the incoming signal with RF power of the first frequency $f_1$ to obtain an output signal with RF power of a harmonic frequency.

The output signal is thereafter amplified in a second amplifying circuit 26 and filtered in a second frequency filter 27 which is connected to the second antenna 22. The second frequency filter 27 is tuned to the second frequency $f_2$ to prevent, i.e. avoid or at least reduce the influence of, signals with RF power of frequencies other than the second frequency $f_2$ from being transmitted from the antenna structure. The first and second amplifying circuit 24 and 26 may be regarded as an amplifier 29 (indicated by dashed lines) divided into two parts, which is powered by an energy source 28, such as a battery, a thermoelectric device, or solar energy device.

Figure 3:
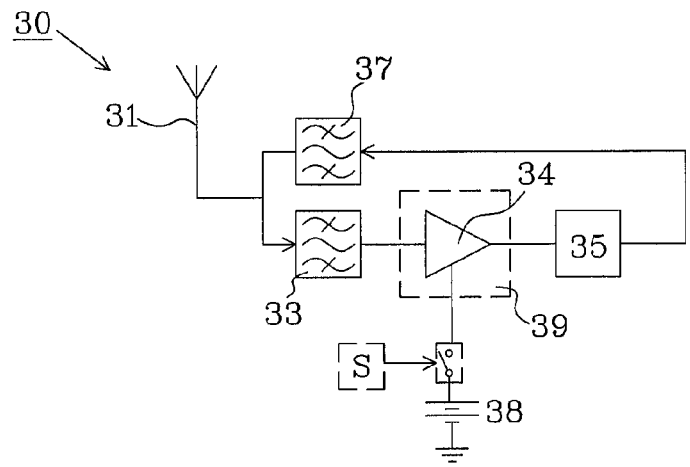
FIG. 3 shows a second embodiment of a transponder according to the invention.

FIG. 3 shows a second embodiment of a transponder 30 comprising an antenna structure with a single antenna 31, which is configured to receive incoming signals having a first frequency $f_1$ and to transmit signals having a second, preferably harmonic, frequency $f_2$. A first frequency filter 33 is connected to the single antenna 31 and is tuned to the first frequency in order to avoid, i.e. prevent or at least reduce the influence of, incoming signals with RF power of frequencies other than the first frequency from being amplified in an amplifier circuit 34. The amplified incoming signal is thereafter fed to a frequency converter 35 that frequency converts the incoming signal into the output signal, preferably by frequency multiplication of the incoming signal with RF power of the first frequency $f_1$ to obtain an output signal with RF power of a harmonic frequency.

The output signal is, in this embodiment, thereafter filtered in a second frequency filter 37 which is connected to the single antenna 31. The second frequency filter 37 is tuned to the second frequency $f_2$ to prevent, i.e. avoid or at least reduce the influence of, signals with RF power of frequencies other than the second frequency $f_2$ to be transmitted from the antenna structure. The amplifying circuit 34 may be regarded as an amplifier 39 (indicated by dashed lines), which is powered by an energy source 38, such as a battery, a thermoelectric device, or solar energy device.

Figure 4:
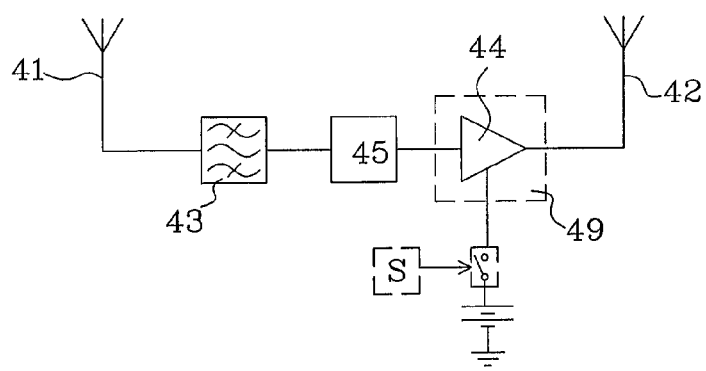
FIG. 4 shows a third embodiment of a transponder according to the invention.

FIG. 4 shows a third embodiment of a transponder 40 comprising an antenna structure with a first antenna 41 configured to receive an incoming signal with RF power of a first frequency $f_1$, and a second antenna 42 configured to transmit an output signal with RF power of a second, preferably harmonic, frequency. A first frequency filter 43 is connected to the first antenna 41 and is tuned to the first frequency in order to avoid, i.e. prevent or at least reduce the influence of, incoming signals with RF power of frequencies other than the first frequency from being frequency converted and thereafter amplified in an amplifier circuit 44. The filtered incoming signal is fed to a frequency converter 45 that frequency converts the incoming signal into the output signal before being fed to the amplifier circuit 44. The frequency conversion is preferably performed by frequency multiplication of the incoming signal with RF power of the first frequency $f_1$ to obtain an output signal with RF power of a harmonic frequency.

The output signal from the amplifier circuit 44 is, in this embodiment, transmitted from the second antenna 42 without being subject to a second filtering process (as described in connection with FIGS. 2 and 3). The amplifying circuit 44 may be regarded as an amplifier 49 (indicated by dashed lines), which is powered by an energy source, such as a battery, a thermoelectric device, or solar energy device.

Figure 5:
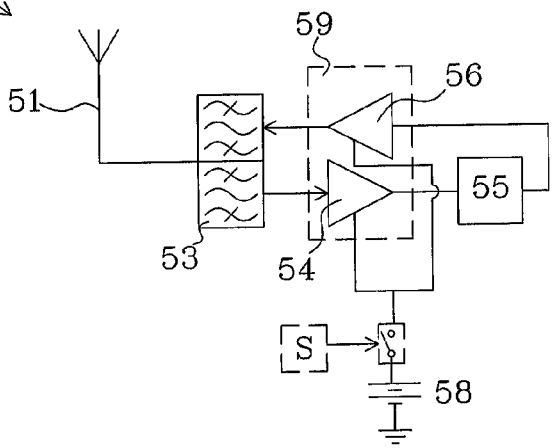
FIG. 5 shows a fourth embodiment of a transponder according to the invention.

FIG. 5 shows a fourth embodiment of a transponder 50 comprising an antenna structure with a single antenna 51, which is configured to receive incoming signals having a first frequency $f_1$ and to transmit signals having a second, preferably harmonic, frequency $f_2$. A duplex filter 53 (configured to provide the same functionality as the first and second frequency filter described in connection with FIGS. 2 and 3) is connected to the single antenna 51 and is tuned to the first frequency in order to avoid, i.e. prevent or at least reduce the influence of, incoming signals with RF power of frequencies other than the first frequency from being amplified in a first amplifier circuit 54. The amplified incoming signal is thereafter fed to a frequency converter 55 that frequency converts the incoming signal into the output signal, preferably by frequency multiplication of the incoming signal with RF power of the first frequency $f_1$ to obtain an output signal with RF power of a harmonic frequency.

The output signal is, in this embodiment, thereafter amplified in a second amplifying circuit 56 and filtered in the duplex filter 53 which is connected to the single antenna 51. The duplex filter 53 is also tuned to the second frequency $f_2$ to prevent, i.e. avoid or at least reduce the influence of, signals with RF power of frequencies other than the second frequency $f_2$ to be transmitted together with the output signal from the antenna structure. The first and second amplifying circuit 54 and 56 may be regarded as an amplifier 59 (indicated by dashed lines) divided into two parts, which is powered by an energy source 58, such as a battery, a thermoelectric device, or solar energy device.

An advantage is that the transponder is in "idle mode", i.e. does not retransmit a signal until it is hit by a signal having the correct frequency, and stops to retransmit when it is not hit by the signal anymore, which thereby increases the directivity of the transponder.

Another advantage is that the transponder may be used to locate a person (which is provided with a transponder) over a long distance, or through thick walls in a building, compared to passive prior art transponders.

For example, the invention avoids the problem of reflections occurring with the solution presented in the previously mentioned White Paper on Firefighter Location Systems by MSA.

The transponders of FIGS. 2-5 may as a preferred option include a sensor S and an associated activator (indicated by dashed boxes) such as a controllable switch. The sensor S is configured to respond to physical stimulus for generating a control signal, and this control signal act as control input to the switch for selectively activating (when the switch is closed) or deactivating (when the switch is open) the possibility to transmit an output signal. Preferably, the sensor S controls (via the control signal to the switch) the power feeding of the amplifier in order to deactivate, or activate, the possibility to retransmit the incoming signal as a transparent output signal.

In general, the sensor may be selected from a wide variety of different sensors such as a motion sensor, a temperature sensor, a gas sensor, a pressure sensor and a gyro, depending on the particular application. Thus, the sensor respond to physical stimulus such as motion, heat/cold, gas, pressure and physical orientation when generating the control signal as output response.

In this way, it may be easier to localize certain transponders (and thereby persons to which a transponder is attached) since the possibility to retransmit the incoming signal as an output signal is activated only at certain physical circumstances as detected by the sensor. For example, when provided with a motion sensor, the chance of receiving signals from any other transponder than a transponder attached to a non-moving person is reduced.

It should also be understood that it is possible to use/combine two or more sensors in the transponder.

Since the transponder has components, such as amplifiers, requiring an energy source for transmitting the output signal, the energy consumption is significantly reduced since the incoming signal is allowed to be retransmitted only at certain physical circumstances as detected by the sensor.

By way of example, when the sensor includes a motion sensor, the activator for selectively activating or deactivating the possibility to retransmit the incoming signal as an output signal is configured for deactivating the possibility to retransmit the incoming signal as an output signal if the motion sensor detects that the transponder is moving, and for activating the possibility to retransmit the output signal if the motion sensor detects that the transponder is stationary.

The motion sensor may be based on any motion-sensing technology, and may e.g. include any self-motion sensor known to the art.

A motion sensor capable of sensing its own motion is sometimes referred to as an inertial sensor or an internally referenced autonomous motion sensor. Such inertial sensors can be manufactured, e.g. by using advanced micro-electro-mechanical technologies.

Figure 6:
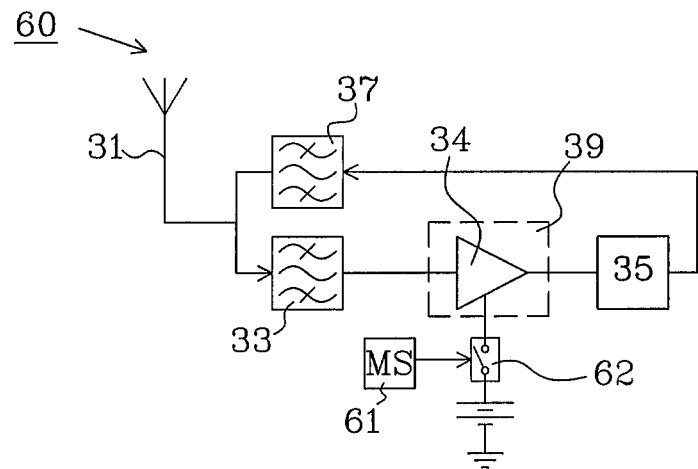
FIG. 6 shows a fifth embodiment of a transponder according to the invention.

FIG. 6 shows a fifth embodiment of a transponder 60 with motion sensor functionality. The transponder of FIG. 6 corresponds to the transponder illustrated in FIG. 3, but here the sensor is exemplified as a motion sensor (MS) 61 configured to control a switch 62 in order to deactivate the possibility to retransmit the incoming signal as the output signal if the motion sensor 61 detects that the transponder 60 is moving (by arranging the switch 62 to be open) and to activate the possibility to retransmit the output signal if the motion sensor 61 detects that the transponder 60 is stationary, e.g. for a certain time period, such as five minutes (by arranging the switch 62 to be closed). If needed, the motion sensor 61 may be powered by the battery.

When the possibility to retransmit the incoming signal as the output signal is controlled by a motion sensor in the transponders, this means that only stationary (non-moving) transponders will be allowed to retransmit the incoming signal as an output signal. This will facilitate the identification of a missing person, such as a person stuck in an avalanche, and may reduce the time needed to localize the person. This is also applicable to fire rescue missions and other rescue missions, on land or at sea.

In other applications, it may be useful to detect only transponders that are moving.

It should be noted that the motion sensor preferably has an associated delay function (e.g. implemented as a built-in function) to reduce the risk for unnecessary activation/deactivation of the transponder. For example, the sensor may be configured such that the transponder has to be stationary (non-moving) over a certain period of time before the sensor sends a control signal to the switch for activating retransmission of the transponder output signal. By way of example, this time period may be set to say 5 minutes so that the transponder needs to be stationary (non-moving) for more than 5 minutes to activate the transponder. A shorter time period may be used in time-critical applications. This type of setting and/or conditions may be controlled by a microprocessor connected to the sensor(s).

Figure 7:
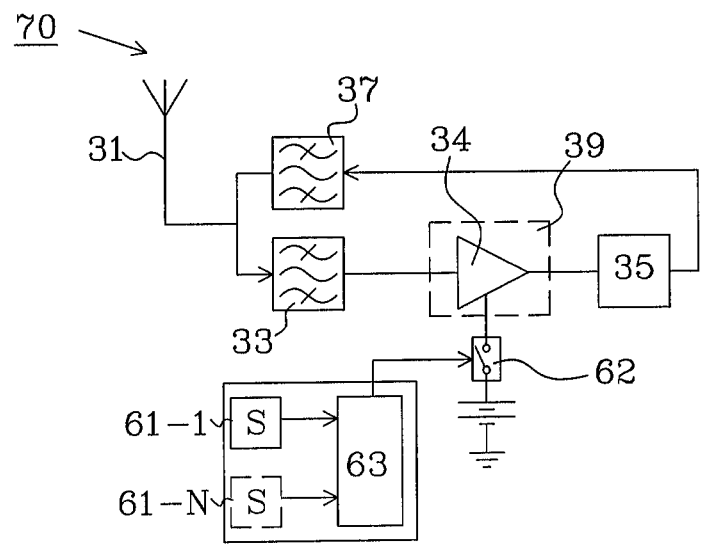
FIG. 7 shows a sixth embodiment of a transponder according to the invention.

FIG. 7 shows a sixth embodiment of a transponder according to the invention. The embodiment of FIG. 7 is similar to that of FIG. 6, but here the transponder 70 also includes a microprocessor 63. The transponder 70 includes one or more sensors 61-1, . . . , 61-N, where N is equal to or greater than 1, and the microprocessor 63 is configured to control the activator 62 based on the control signal(s) of the sensor(s). The microprocessor may be seen as part of the overall sensor system for controlling the activator, or alternatively it may be seen as part of the overall activator.

Depending on the application, the type of sensor to be used may also vary. In fire rescue missions, for example, firemen may be provided with transponders that have motion, gas and/or temperature sensors. The invention will thus facilitate the identification of and/or search for (missing) firemen that are subject to extreme heat or dangerous gases. This may also be important in other applications.

For example, when the sensor includes a gas sensor, the activator for selectively activating or deactivating the possibility to retransmit the incoming signal as an output signal is preferably configured for deactivating the possibility to retransmit the incoming signal as the output signal if the gas sensor does not detect a specific gas or combination of gases, and for activating the possibility to retransmit the incoming signal as the output signal if the gas sensor detects a specific gas or combination of gases.

In another example, the sensor includes a temperature sensor. This may be used for detecting and responding to heat (such as fire) or cold (such as cold air, water or snow).

For detecting and responding to heat, the activator for selectively activating or deactivating the possibility to retransmit the incoming signal as an output signal may be configured for deactivating the possibility to retransmit if the temperature sensor detects that the temperature is lower than a first threshold value, and for activating the possibility to retransmit if the temperature sensor detects that the temperature is higher (heat) than a second threshold value.

For detecting and responding to cold, the activator for selectively activating or deactivating the possibility to retransmit the incoming signal as an output signal may be configured for deactivating the possibility to retransmit if the temperature sensor detects that the temperature is higher than a first threshold value, and for activating the possibility to retransmit if the temperature sensor detects that the temperature is lower (cold) than a second threshold value.

The first threshold value and the second threshold value may be the same. Alternatively, the thresholds may be different in order to implement a so-called hysteresis function. This type of settings and/or conditions may be controlled by the microprocessor.

Similar designs may also be used for detecting and responding to, e.g., high pressure and/or abnormal physical orientation (upside-down in an avalanche as detected by a gyro).

The amplifier circuits, in the above described embodiments, are preferably low noise amplifiers LNA, in order to prevent excessive noise from being generated. An additional advantage with the frequency filter 27, 37 and 53 arranged between the frequency converter and the antenna structure in FIGS. 2, 3, 5 and 6 is that broadband noise generated in the amplifier is prevented from being transmitted. All amplifiers generates noise in a very large frequency band (broadband noise), which is true for amplifiers 25, 35, 49 and 55. This means that each amplifier at least generates noise on the first frequency and the frequency filters 27, 37 and 53 are especially important in these cases, since an oscillation in the circuit may occur, especially when using high gain.

As a non-limiting example, the first frequency filter 23, 33 and 43 may be implemented as a three-pole band pass filter tuned to 860.5 MHz, such as DFCB3860MLDJAA available from Murata (JP), and the second frequency filter 27, and 37 may be implemented as a three-pole band pass filter tuned to 1740 MHz, such as DFCB31G74LDJAA available from Murata (JP).

It should be understood that the embodiments of FIGS. 3, 5, 6 and 7 may be implemented with two antennas, in similarity to the embodiment of FIG. 2.

The transponder according to the invention is preferably configured to transmit a transparent output signal, i.e. having the same information content as the incoming signal, at a harmonic frequency of the incoming signal as mentioned above. However, the invention may be implemented in a transponder wherein the frequency converter is configured to perform frequency division on the incoming signal to obtain the transparent output signal.

One fundamental principle of the present invention is to produce an output signal which is transparent of the incoming signal, but at another frequency. As previously indicated, in order to be able to use detectors available for prior art passive harmonic transponders, it is also desirable to produce a transparent output signal at a harmonic frequency of the first frequency, e.g. at the double frequency of the incoming signal. The detector will not be able to determine if the received signal is transmitted from a prior art passive transponder or from a transponder according to the invention provided they are tuned to the same incoming frequency, but the active transponder according to the present invention has an extended detection range compared to prior art passive transponders.

The invention claimed is:

1. A transponder, comprising:
   an antenna structure configured for receiving an incoming signal with radio frequency (RF) power of a first frequency $f_1$ and for retransmitting the incoming signal as a transparent output signal with RF power of a second frequency $f_2$, different from the first frequency $f_1$, when hit by the incoming signal;
   an amplifier configured to provide an amplified transparent output signal based on the incoming signal;
   a frequency converter configured to convert the incoming signal into the transparent output signal;
   a first frequency filter connected to the antenna structure and tuned to the first frequency $f_1$ for avoiding amplifying incoming signals with RF power of frequencies other than the first frequency $f_1$;
   a sensor configured to respond to physical stimulus for generating a control signal as an output response, wherein the sensor includes a motion sensor; and
   an activator configured for selectively activating or deactivating retransmission based on the control signal, wherein the activator deactivates retransmission if the motion sensor detects that the transponder is moving, and activates retransmission if the motion sensor detects that the transponder is stationary.

2. The transponder of claim 1, wherein the amplifier comprises a first amplifying circuit configured for amplifying the incoming signal before the incoming signal is converted by the frequency converter.

3. The transponder of claim 1, wherein the amplifier comprises a second amplifying circuit configured to amplify the transparent output signal before retransmission of the incoming signal.

4. The transponder of claim 1, further comprising a second frequency filter connected to the antenna structure and tuned to the second frequency $f_2$ for avoiding transmitting signals with RF power of frequencies other than the second frequency $f_2$.

5. The transponder of claim 4, wherein the first frequency filter and the second frequency filter are implemented as a duplex filter connected to the antenna structure.

6. The transponder of claim 4, wherein the antenna structure comprises a single antenna configured to receive incoming signals having the first frequency $f_1$ and to transmit signals having the second frequency $f_2$.

7. The transponder of claim 1, wherein the antenna structure comprises a receive antenna configured for receiving signals having the first frequency $f_1$ and a transmit antenna configured for transmitting signals having the second frequency $f_2$.

8. The transponder of claim 1, wherein the motion sensor is configured for controlling a switch in order to:
   deactivate retransmission if the motion sensor detects that the transponder is moving, and
   activate retransmission if the motion sensor detects that the transponder is stationary.

9. The transponder of claim 8, wherein the motion sensor is configured for controlling power supplied to the amplifier in order to deactivate or activate retransmission.

10. The transponder of claim 1, wherein the frequency converter is configured for performing frequency multiplication on the incoming signal to convert the incoming signal into the transparent output signal, whereby the transponder is configured for retransmitting the incoming signal as the transparent output signal with RF power of a harmonic frequency of the first frequency.

11. The transponder of claim 1, wherein the frequency converter is configured for performing frequency division on the incoming signal to convert the incoming signal into the transparent output signal, whereby the transponder is configured for retransmitting the incoming signal as the transparent output signal with RF power of a sub-harmonic frequency of the first frequency.

12. The transponder of claim 1, wherein the frequency converter is configured for performing frequency mixing on the incoming signal to convert the incoming signal into the transparent output signal, whereby the transponder is configured for retransmitting the incoming signal as the transparent output signal with RF power of the second frequency that differs from the first frequency.

13. The transponder of claim 1, wherein the sensor includes at least one of a temperature sensor, a gas sensor, a pressure sensor, and a gyroscopic sensor.

14. A transponder, comprising:
   an antenna structure configured for receiving an incoming signal with radio frequency (RF) power of a first frequency $f_1$ and retransmitting the incoming signal as a transparent output signal with RF power of a second frequency $f_2$, different from the first frequency $f_1$, when hit by the incoming signal;
   an amplifier configured for generating an amplified transparent output signal based on the incoming signal;
   a frequency converter configured for frequency converting the incoming signal into the transparent output signal;
   a first frequency filter connected to the antenna structure and tuned to the first frequency $f_1$ for avoiding amplifying incoming signals with RF power of frequencies other than the first frequency $f_1$;
   a sensor configured for responding to a physical stimulus for generating a control signal as an output response, wherein the sensor includes a gas sensor; and
   an activator configured for selectively activating or deactivating retransmission based on the control signal, wherein the activator deactivates retransmission if the gas sensor does not detect a predetermined gas or combination of gasses, and activates retransmission if the gas sensor detects the predetermined gas or combination of gasses.

15. A transponder, comprising:
   an antenna structure configured for receiving an incoming signal with radio frequency (RF) power of a first frequency $f_1$ and retransmitting the incoming signal as a transparent output signal with RF power of a second frequency $f_2$, different from the first frequency $f_1$, when hit by the incoming signal;
   an amplifier configured for generating an amplified transparent output signal based on the incoming signal;
   a frequency converter configured for frequency converting the incoming signal into the transparent output signal;
   a first frequency filter connected to the antenna structure and tuned to the first frequency $f_1$ for avoiding amplifying incoming signals with RF power of frequencies other than the first frequency $f_1$;
   a sensor configured for responding to a physical stimulus and generating a control signal as output response, wherein the sensor includes a temperature sensor; and
   an activator for selectively activating or deactivating retransmission based on the control signal, wherein the activator carries out either one of the following:
      deactivates retransmission if the temperature sensor detects that a temperature is lower than a first threshold value, and activates retransmission if the temperature sensor detects that the temperature is higher than a second threshold value; or
      deactivates retransmission if the temperature sensor detects that the temperature is higher than the first threshold value, and activates retransmission if the temperature sensor detects that the temperature is lower than the second threshold value.

16. The transponder of claim 15, wherein the activator includes a controllable switch, and the sensor is configured for controlling the switch.

17. The transponder of claim 15, further comprising at least one additional sensor configured for responding to an additional physical stimulus and generating an additional control signal, and a microprocessor configured for controlling the activator based on control signal and the at least one additional control signal.

* * * * *